United States Patent [19]

Tyan et al.

[11] Patent Number: 4,797,871
[45] Date of Patent: Jan. 10, 1989

[54] ERASABLE OPTICAL RECORDING METHOD

[75] Inventors: Yuan S. Tyan; Kee C. Pan, both of Webster; Fridrich Vazan, Pittsford, all of N.Y.

[73] Assignee: Eastman Kodak Company, Rochester, N.Y.

[21] Appl. No.: 907,553

[22] Filed: Sep. 15, 1986

[51] Int. Cl.$^4$ .................................................. G11B 7/24
[52] U.S. Cl. .................................. 369/100; 369/288; 369/111; 365/113; 346/76 L
[58] Field of Search ............... 369/100, 284, 288, 286, 369/111, 275; 365/113; 346/76 L, 135.1, 137

[56] References Cited

U.S. PATENT DOCUMENTS 4,238,803 12/1980 Terao ................................. 369/275
4,566,088 1/1986 Yoshida .............................. 346/76 L

OTHER PUBLICATIONS

"New Ideas for Phase-Change Media-Achieving Sub-Microsecond Erase With Data Stability", by Chen et al., presented Oct. 15-17, 1985, IEEE and OSA, Washington, D.C.

Primary Examiner—Alan Faber
Attorney, Agent, or Firm—John R. Everett

[57] ABSTRACT

The method comprises the steps of:
a. providing an optical recording element comprising an amorphous thin film of a GeTe alloy;
b. preparing the thin film for writing and erasing cycles by crystallizing the film;
c. writing on selected portions of the prepared film with modulated laser beam, thereby converting portions on the films to a phase-segregated amorphous state.

5 Claims, 4 Drawing Sheets

FIG. 2a
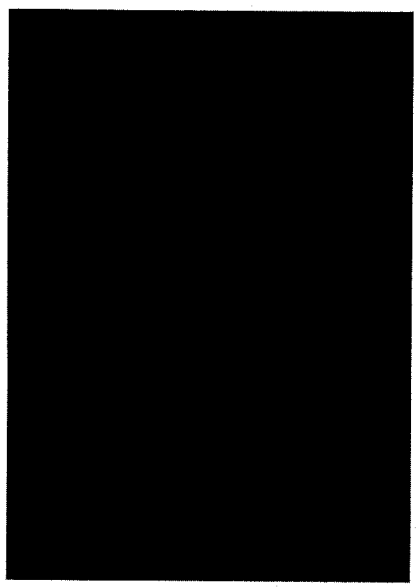
FIG. 2b
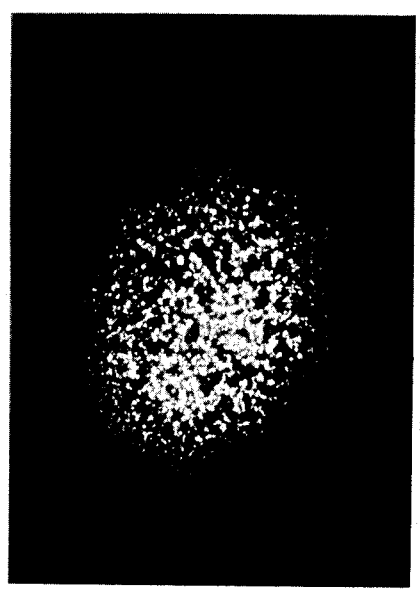
FIG. 2c

ERASABLE OPTICAL RECORDING METHOD

FIELD OF THE INVENTION

This invention relates to an optical recording method.

BACKGROUND OF THE INVENTION

It is known that certain materials, which exist in a stable condition at room temperature, in either a substantially amorphous or substantially crystalline state can be converted from one of these states to the other by supplying sufficient energy to heat the material to its melt temperature and then allowing it to cool under controlled conditions to a crystalline or an amorphous state.

It is also known that such materials may be used for storing and retrieving information. These materials may be used in the form of thin films for optical recordings. The thin films are written upon selectively changing particular areas of the thin film from one state to the other (from amorphous to crystalline or crystalline to amorphous). Such change may be accomplished by providing a low amplitude energy pulse for sufficient duration to heat the material to just below its melting point after which the film slowly cools in the crystalline state. On the other hand to convert the film from a crystalline to an amorphous state, rapid cooling is essential. This change, may be accomplished by pulsing the film with a high energy pulse source to raise the film to its melting point. The film must then be rapidly cooled to freeze the film in the amorphous state before crystallization can occur.

One of the most difficult challenges is to develop optical recording elements which possess both fast erasure speed and long data retention time. Both of these desirable features relate to the transition of the film from the amorphous phase to the crystalline phase. To have fast erasure speed requires the crystallization rate to be exceedingly fast at the elevated temperatures produced by a laser pulse. Long data retention time, on the other hand, requires exceedingly slow crystallization rate during keeping near room temperatures.

Most studies have been concentrated on films of tellurium rich (Te>85%) alloys. For these materials, however, long erasure time (>1 μs) is needed unless data retention time is sacrificed.

Recently, Chen et al., in a paper entitled "New Ideas for Phase-Change Media-Achieving Sub-Microsecond Erase With Data Stability", presented Oct. 15-17, 1985, at the Topical Meeting on Optical Data Storage, IEEE and OSA, in Washington, D.C., has reported achieving a significant improvement in performance by using nearly stoichiometric GeTe films. However, such films possess limited corrosion resistance and data stability.

SUMMARY OF THE INVENTION

This invention provides a method of writing and erasing written information on optical recording elements comprising the steps of:

a. providing an optical recording element comprising a support and an amorphous thin film of a GeTe alloy; wherein the ratio of Ge:Te in the film is 45/55 to 70/30 on an atom-to-atom basis;

b. preparing the thin film for writing and erasing cycles by:

i. heating the film, or a selected portion thereof, above its melting point using a laser or light beam; rapidly cooling the film to form a phase-segregated amorphous state evidenced by the appearance of regions of different densities and then heating the same areas of the film with a focused beam to below its melting point to transform these areas from the phase-segregated amorphous state to a crystalline state; or, ii. crystallizing the film, or a selected portion thereof, by heating the film to its crystallization temperature;

c. writing on selected portions of the thus prepared film with a focused information modulated laser beam, thereby converting those portions on the films upon which the laser beam has been focused to a phase-segregated amorphous state from a crystalline state; and, d. when desired, erasing the written information by heating those portions of the film bearing the written information with a focused unmodulated or high frequency modulated laser beam thereby converting the written portions of the film to a crystalline state from the phase-segregated amorphous state.

The method of this invention makes erasable optical recording elements comprising thin films of GeTe, in which the Ge/Te ratio varies from 45/55 to 70/30. The films possess improved contrast. Moreover, the erasure rate is significantly less than 1 microsecond.

In preferred embodiments the optical recording elements used in the method of this invention comprise greater than 55 atomic percent of Ge. Such Ge rich films are more desirable than stoichiometric GeTe films in that they exhibit improved corrosion resistance and improved amorphous phase stability compared to stoichiometric GeTe films. Corrosion resistance is improved because the excess Ge reduces the concentration of the corrosion prone Te. Amorphous phase stability is improved because the crystallization temperature of the Ge/Te film increases drastically with increasing Ge. In thin films containing greater than 59 atomic percent Ge, crystallization temperatures are above 275° C. thereby ensuring improved data stability.

BRIEF DESCRIPTION OF THE DRAWINGS

FIGS. 2a, 2b and 2c are Transmission Electron Micrographs (TEM) of a thin film of the invention in various physical states.

DETAILED DESCRIPTION OF THE INVENTION

Thin amorphous film recording layers can be prepared by conventional thin film deposition techniques such as evaporation, RF (radio frequency) and DC (direct current) sputtering from an alloy target, and RF and DC co-sputtering from targets of the individual elements. Enhancement of sputtering processes by applying magnetic fields (magnetron sputtering) can also be used. The thickness of the film can be from a few tens (10) to a few hundreds nanometers (500 nm) depending on the compromise among factors such as sensitivity, production rate, material cost, ease of control, etc.

Supports upon which such films are deposited include plastic plates, such as polyethylene terephthalate, polymethyl methacrylate, polycarbonate, glass plates, metal plates or paper.

Figure 1:
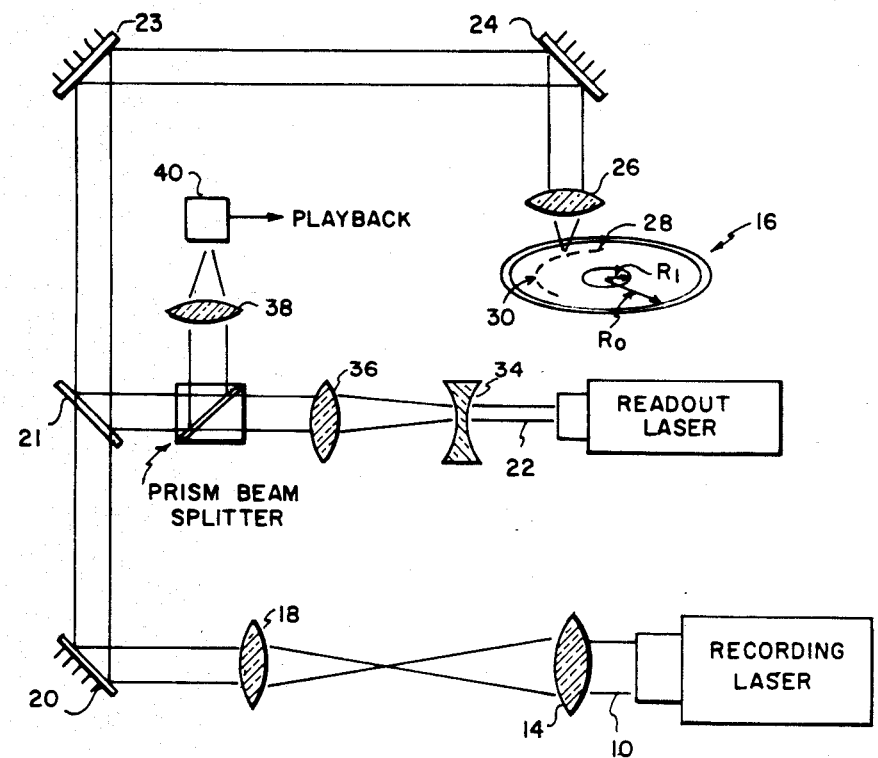
FIG. 1 is a description of a schematic recording, readback, and erasure apparatus for using the method of the invention.
Figure 2:
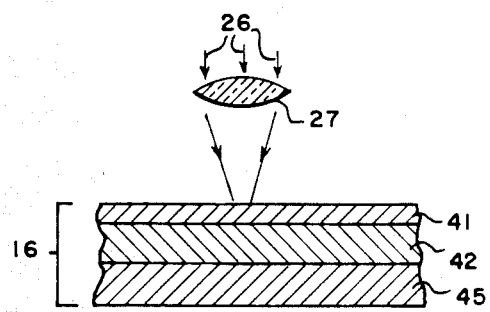
FIG. 2 is a schematic cross section of an optical recording element used in the method of this invention.

FIG. 1 shows a schematic of an apparatus for writing information on a recording element 16 of the invention and for playing back the recorded information therefrom. Recording element 16 comprises, as shown in FIG. 2, an overcoat layer such as acrylic 41, a GeTe thin film according to this invention 42 on substrate 45. In response to a drive signal, the intensity of a laser diode writing beam 10 is modulated in accordance with information to be recorded on film 42. The modulated laser beam is collected by a lens 14 and collimated by a lens 18 and is directed by means of mirror elements 20. 23 and 24 to a high numerical aperture lens 26 which focuses the modulated laser beam to a recording spot 28 on the recording layer 42.

The first few writing cycles can be used to prepare film 42 for the write-erase cycle, in effect carrying out step b of the method of the invention.

Preparation of the film for write-erase cycling can also be achieved by other heating techniques. Heating or exposing the film to high power, or short duration light (Zenon) pulses are examples of such techniques. Heating as required in step b.ii. can be carried out on a hot plate, oven or pulsed light exposure. FIGS. 2a, 2b and 2c are TEM micrographs of films which have been prepared for write-erase cycling with laser pulses. Segregation of phases can be inferred by the appearance of regions of two different densities in (b) of the micrograph. Selected Area Electron Diffraction (SAED) indicates that the spot is still amorphous, but the region is much easier to crystallize by subsequent laser beams than the unprepared areas. The fact that phase-segregation actually improves the crystallization rate is surprising in view of the teachings of Chen et al.

Of course the film could have been prepared for write-erasure cycling by heating the film 42 up to its crystallization temperature according to step b.ii. This would bypass initial information of atom phase-segregated amorphous state.

During the write portion of the cycle, the entire element is spun at a constant rate, e.g. 1800 rotations per minute (rpm). As a result, a track of information 30 is recorded on the optical recording layer in the form of selected phase-segregated areas. As recording continues, the recording spot 28 is caused (by means not shown) to scan radially inward across the film 42, thereby causing information to be recorded along a spiral or concentric track that extends from an outer radius $R_o$ to an inner radius $R_i$. The sizes and spacings of the recorded information marks vary in accordance with the information content of the recording laser drive signal, as well as with radial position on film 42.

Erasure can be accomplished by the above described recording procedure except that the laser 10 is unmodulated, or is modulated at a higher frequency than that carrying the recorded information.

During the readback process, the element 16, comprising film 42, now bearing the recorded information is spun at the same rate as it was spun during the recording process. A laser beam 22 from a readout laser (which can, if desired, be the same laser used for recording) is expanded in diameter by means of lenses 34 and 36. The optical path of the readout laser beam is folded by a beam splitter 21 and mirrors 23 and 24 so that the readout laser beam is focused to a playback spot on the film 42 by the high numerical aperture lens 26. The film 42 is reflective so that the radiation forming the playback spot is reflected back through the high numerical aperture lens 26 after interacting with the information marks recorded on the film 42. A lens 38 directs reflected laser radiation which has been diverted by the prism beamsplitter onto a detector 40 which produces an electrical playback signal in response to temporal variations (contrast) in the irradiance of the reflected laser radiation falling on the detector.

The thin film 42 is written upon with a coherent beam of electromagnetic radiation of sufficient energy to convert selected portions of the film 42 from a crystalline state to the phase-segregated amorphous state. The thin film 42 is sufficiently sensitive to laser powers of about 2.5 to 20 mW at laser pulsewidth of 50 to 500 ns to make the conversion.

Figure 3:
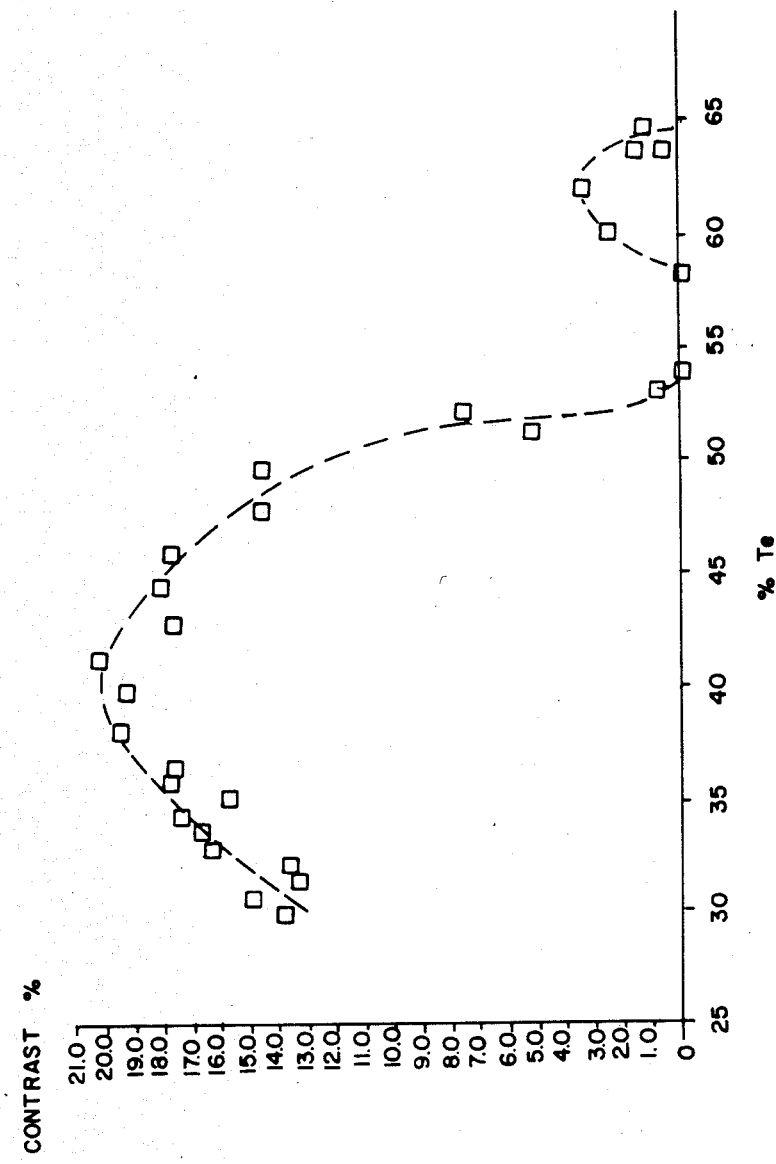
FIG. 3 is a curve showing the experimental results of the Examples 2-29 herein.

Test recordings on the thin films were made with a static pit tester. The static pit tester provides automated facilities for exposing standard test patterns on two-inch by two-inch glass slides of film samples with a laser. For the erasability studies, the output beam from a 830 nm diode laser is focused onto a spot on the sample through a high NA objective lens. The series of laser pulses alternating between a higher power and a lower power is applied to the sample. The reflectance of the sample after each laser pulse is measured and recorded to indicate phase changes caused by the preceding laser pulses. The higher power pulses bring the material to above the melting point and change the materials from the crystalline state to the phase-segregated amorphous state after cooling. The reflectance of the material is decreased. The lower power laser pulses heat the material to below the melting point and cause the material to crystallize. The reflectance between the two states is referred to as reflectance contrast by the following definition.

$$\text{Contract} = [(R_c - R_x)/(R_c + R_x)] \times 100\%$$

wherein $R_c$ and $R_x$ are the reflectances of the crystalline and the amorphous states respectively. The reflectance contrast is used to select erasable media and is shown in FIG. 3 for the Ge-Te alloys using a particular set of write/erase conditions.

The practice of the invention is illustrated by the following examples:

EXAMPLE 1

A Ge-Te alloy thin-film ($90 \times 10^{-9}$ m thick) was prepared by co-sputtering from two RF-magnetron targets containing Ge and Te, respectively, using 0.4 Pa (3 mTorr) of purified Ar as the sputtering gas. The two targets were spaced apart with glass substrates spinning over them at 150 rpm so that alternating thin layers $0.05 \times 10^{-9}$ m (<0.05 nm) of Ge and Te could be coated from the two targets to form an alloyed thin-film. The composition of the film was determined by the relative deposition rates from the two targets. In this example a composition of about $Ge_{0.59}Te_{0.41}$ was achieved. After the deposition, a sprayed clear acrylic layer of several $\mu$m thickness was applied over the surface of the film. This layer was used to reduce the deformation of the Ge-Te thin-film by the write/erase laser beam so that erasable read/write experiments could be performed.

Write and erase cycling on the thin film was performed with the static tester described hereinbefore using an 860 nm diode laser beam focused by a 0.95 NA objective lens of variable powers and pulse lengths. Using 800 ns, 3.3 mW pulses for erasing (crystallizing) and 800 ns, 10 mW pulses for writing (amorphizing) the cycling of the material in a spot between the crystalline state and the amorphous state was monitored by the reflectance changes. Over 1000 write-erase cycles were carried on the film, thus this film was erasable over 1000 of such cycles. The first few cycles in this example served to prepare the film for writing and erasure according to step b. of the method of this invention.

FIG. 2 is a transmission electron micrograph of the (a) amorphous as deposited film, (b) and the phase-segregated amorphous state, and (c) the crystallized state of the film. The physical state of the film in (b) and (c) result from the read-write cycling. Writing converts the film from (c) to (b). Erasure converts the film from (b) to (c). The results clearly indicate that the film could be written on and then erased over 1000 cycles.

EXAMPLES 2-29

Twenty-eight (28) different optical recording elements were prepared as in Example 1. Each element comprises a GeTe alloy thin film for recording. Each element consisted of a different Ge/Te concentration ratio. Several read-write cycles were carried out on each film as described in Example 1. The Ge/Te concentration ratio in the films range from 70/30 to 35/65. Based on the contrast achieved between the amorphous segregated phase (written) and the crystallized phase (erase), concentration ratios of Ge/Te in the range 70/30 to 45/55 proved to be erasable. The reflection contrast achieved with these varying concentration ratios is shown in the FIG. 3. The write-erasure time was 0.8 μs.

Figure 4:
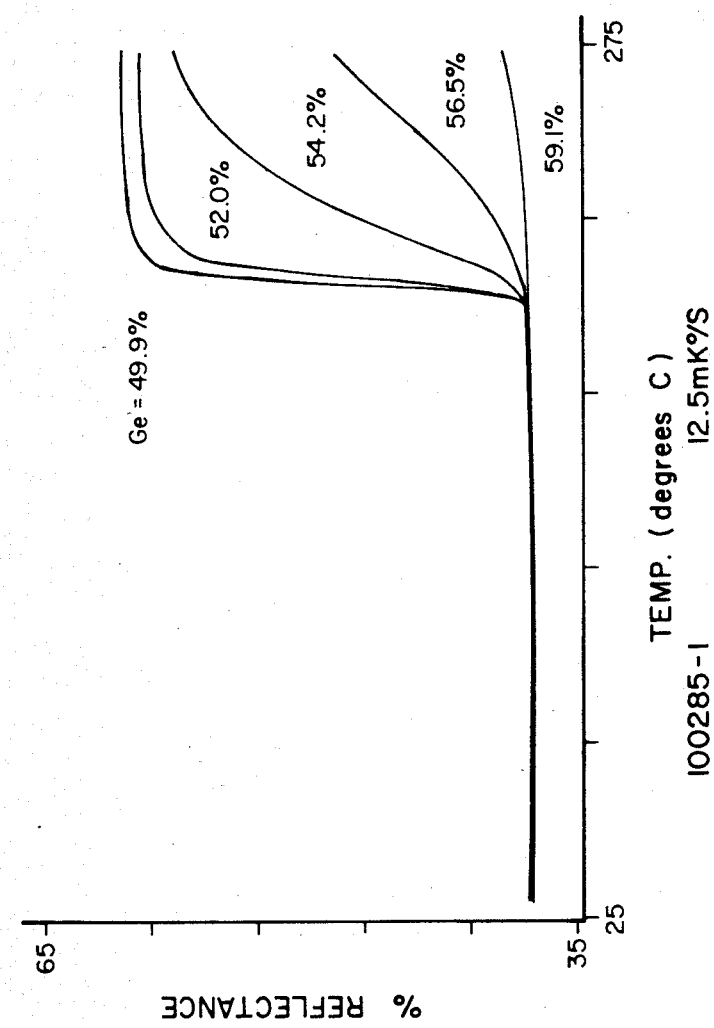
FIG. 4 presents a set of curves showing varying percent reflectance based on varying germanium contents of the films used in the method of this invention.

FIG. 4 is a reflectance versus temperature graph performed with films containing various concentrations of Ge/Te. The Ge content of each film is indicated on the graph. This graph shows the effect of heating on the optical reflectance of GeTe films at various concentrations of Ge. The increase in reflectance is caused by the crystallization of the films. As the Ge content of the film increases, the temperature at which crystallization takes place also increases so that according to the graph a film comprising 59.1 atom percent of Ge crystallizes at a temperature above 275° C. In comparison, the crystallization temperature of a thin film comprising 49.9 percent Ge is 210° C. This data shows that the films of this invention have long data retention times.

The invention has been described in detail with particular reference to preferred embodiments thereof, but it will be understood that variations and modifications can be effected within the spirit and scope of the invention.

We claim:

1. A method of writing and erasing on a optical recording element comprising the steps of:
   a. providing an optical recording element comprising a support and an amorphous thin film of a GeTe alloy; wherein the ratio of Ge:Te in the film is 45/55 to 70/30 on an atom-to-atom basis
   b. preparing the thin film for writing and erasing cycles by:
      i. heating the film, or a selected portion thereof, above its melting point using a pulsed laser or light beam; rapidly cooling the film to form a phase-segregated amorphous state evidenced by the appearance of regions of different densities; and then heating the same areas of the film with a focused beam to below its melting point to transform those areas from the phase-segregated amorphous state into a crystalline state; or,
      ii. crystallizing the film, or a selected portion thereof, by heating the film to its crystallization temperature;
   c. writing on selected portions of the thus prepared film with a focused information modulated laser beam, thereby converting those portions on the films upon which the laser beam has been focused to a phase-segregated amorphous state from a crystalline state; and,
   d. when desired, erasing the written information by heating those portions of the film bearing the written information with a focused unmodulated or high frequency modulated laser beam thereby converting the written portions of the film to a crystalline state from the phase-segregated amorphous state.

2. The method of claim 1, wherein writing and erasure is carried out for a plurality of cycles.

3. The method of claim 1, wherein the heating in steps b.i or b.ii are carried out by exposing the film to (a) high power short duration light pulses, or (b) a few write laser pulses.

4. The method of claim 1, wherein the Ge/Te ratio in the film is 55/45 to 70/30 on an atom-to-atom basis.

5. The method of claim 1, wherein the Ge/Te film comprises greater than 59 atomic percent Ge.

* * * * *